United States Patent [19]

Brady et al.

[11] Patent Number: 5,473,931
[45] Date of Patent: Dec. 12, 1995

[54] METHOD AND APPARATUS FOR CALIBRATING THREE-DIMENSIONAL SPACE FOR MACHINE VISION APPLICATIONS

[75] Inventors: Mark J. Brady, Cottage Grove; Darin G. Cerny, St. Paul; Alex Rodriguez, Woodbury, all of Minn.

[73] Assignee: Minnesota Mining and Manufacturing Company, St. Paul, Minn.

[21] Appl. No.: 422,579

[22] Filed: Apr. 14, 1995

Related U.S. Application Data

[63] Continuation of Ser. No. 95,908, Jul. 22, 1993, abandoned.
[51] Int. Cl.⁶ .................................................. G01C 25/00
[52] U.S. Cl. ........................ 73/1 D; 348/169; 348/148; 348/135; 340/937
[58] Field of Search ........................ 73/1 D; 340/933, 340/934, 937, 942; 364/436, 438, 560, 561, 571.01; 348/135–137, 140–142, 148, 149, 169

[56] References Cited

U.S. PATENT DOCUMENTS

| | | | |
|---|---|---|---|
| D. 310,793 | 9/1990 | Castagna | D10/114 |
| 3,088,022 | 4/1963 | Schmidt | 362/82 |
| 3,112,888 | 12/1963 | McKenzie | 362/61 |
| 3,487,359 | 12/1969 | McClintock | 362/82 |
| 3,685,012 | 8/1972 | Case et al. | 340/937 |
| 3,924,107 | 12/1975 | Sakai . | |
| 3,986,007 | 10/1976 | Rouff, Jr. . | |
| 4,044,377 | 8/1977 | Bowerman | 348/136 |
| 4,152,854 | 5/1979 | Berry, Jr. et al. | 40/592 |
| 4,180,010 | 12/1979 | McDermott et al. | 362/80 |
| 4,232,456 | 11/1980 | Harmon et al. | 348/141 |
| 4,396,942 | 8/1983 | Gates | 348/135 |
| 4,695,892 | 9/1987 | Mary | 348/135 |
| 4,835,515 | 5/1989 | McDermott et al. | 340/478 |
| 4,839,648 | 6/1989 | Beucher et al. . | |
| 4,847,772 | 7/1989 | Michalopoulos et al. . | |
| 4,893,922 | 1/1990 | Eichweber | 348/140 |
| 4,994,681 | 2/1991 | Mann | 348/142 |
| 5,073,819 | 12/1991 | Gates et al. | 364/560 |
| 5,134,661 | 7/1992 | Reinsch | 382/1 |
| 5,295,073 | 3/1994 | Celette | 364/560 |
| 5,296,852 | 3/1994 | Rathi | 340/933 |
| 5,402,118 | 3/1995 | Aoki | 340/933 |

FOREIGN PATENT DOCUMENTS

| | | | |
|---|---|---|---|
| 521396 | 7/1953 | Belgium | 362/82 |
| 1009201 | 4/1977 | Canada | 362/72 |
| 0377480 | 7/1990 | European Pat. Off. . | |
| 2003202 | 8/1971 | Germany | 362/61 |
| 2818499 | 11/1978 | Germany | D10/114 |
| 684069 | 3/1965 | Italy | 362/82 |
| 60-10112 | 1/1985 | Japan | 340/937 |
| 857742 | 1/1961 | United Kingdom | 362/82 |
| WO85/04245 | 9/1985 | WIPO . | |

OTHER PUBLICATIONS

Inigo; "Application of Machine Vision to Traffic Monitoring and Control"; IEEE Transactions on Vehicular Technology; vol. 38, No. 3, Aug., 1989.

Kobatake et al.; "Measurement of Two-Dimensional Movement of Traffic By Image Processing"; Proceedings: ICASSP 87, 1987 International Conference on acoustics, speech, and signal processing; Dallas, Tex., Apr. 6–9, 1987.

*Primary Examiner*—Hezron E. Williams
*Assistant Examiner*—Daniel S. Larkin
*Attorney, Agent, or Firm*—Gary L. Griswold; Walter N. Kirn; Michael K. Ouyang

[57] ABSTRACT

A calibration apparatus for calibrating three-dimensional space for a machine vision system and a method for using the calibration apparatus for calibrating the machine vision system are disclosed. The calibration apparatus comprises pairs of indicators, such as lights, mounted on a frame, each pair of lights separated by a known horizontal distance. The calibration apparatus may be mounted on the back of a vehicle that moves the apparatus through a roadway scene at a known speed. A machine vision system tracks the calibration apparatus, specifically the pairs of lights mounted on the frame, and maps the pixel space of the machine vision system to three-dimensional space.

10 Claims, 7 Drawing Sheets

METHOD AND APPARATUS FOR CALIBRATING THREE-DIMENSIONAL SPACE FOR MACHINE VISION APPLICATIONS

CROSS-REFERENCE TO RELATED APPLICATION

This application is a continuation of U.S. Ser. No. 08/095,908, filed Jul. 22, 1993, now abandoned.

FIELD OF THE INVENTION

This invention relates generally to machine vision systems for tracking objects within a three-dimensional space. In particular, the invention relates to a method and apparatus for calibrating a three-dimensional space such that pixel space used by the machine vision system is mapped to real-world measurements.

BACKGROUND OF THE INVENTION

With the volume of vehicles using roadways today, traffic detection and management have become more important. Current intersection control and traffic data collection devices, namely, inductive loops, ultrasonic and radar systems possess limitations in their area coverage for individual devices. Machine vision systems have begun to assist in traffic management. Machine vision systems typically include video cameras overlooking traffic scenes. The video cameras output video images and the machine vision system processes the images to detect, classify and track vehicles passing through the traffic scene. The information derived from the detection, classification and tracking is then used by the machine vision system for intersection control, incident detection, traffic data collection and other traffic management functions.

Machine vision systems analyze a traffic scene by frame-by-frame analysis of video images acquired by video cameras at traffic scenes. The video consists of many video frames taken at constant time intervals, for example 1/30th of a second time intervals. The video is digitized so that the machine vision system analyzes a pixel representation of the scene. A typical digitized video image array for a video frame will contain a 512×512 pixel image of the scene. Each pixel has an integer number defining intensity and may have a definition range for three colors of 0–255.

Machine vision systems have advantages over prior traffic detection devices because machine vision systems can directly extract properties of vehicles, such as velocity and acceleration. Prior detection devices, such as inductive loops, inferred these properties based on detection of vehicles at known locations. Besides mere detection of vehicles, some machine vision systems further have the capability to track detected vehicles.

Before a machine vision system can accurately and directly extract traffic properties, such as acceleration and velocity, the machine vision system must be able to map two-dimensional pixel space to three-dimensional real-world measurements. For a machine vision system to have the capability of determining certain vehicle parameters, such as velocity, the system must be able to determine the approximate real-world distance a vehicle has moved and the approximate time the vehicle needed to travel that real-world distance. Machine vision systems, however, evaluate the location and the movement of vehicles within a scene by their location within a video frame. Therefore, the machine vision system must be able to determine the real-world distance a vehicle has traveled from one video frame to the next video frame, based on the location of the vehicle within the video image.

One way to calibrate a machine vision system, in other words, map the pixel space of the video image of a traffic scene to the real-world measurements of the scene, is by physically measuring distances between specific points within regions of interest in a scene. While distances between specific points are measured, these points are contemporaneously located within the video image and the real-world distances between these points are assigned to the corresponding distances between the specific points in the pixel space. This method of calibration is labor and time intensive.

Calibration allows the machine vision system to analyze a pixel representation of a traffic scene and map the real-world measurements to the pixel space. Thus, after calibration, an operator of the machine vision system can ascertain the real-world distances a vehicle has moved while the operator is viewing a display of the video. Further, the machine vision system can determine traffic parameters associated to the vehicle when the vehicle passes through the specific points measured.

SUMMARY OF THE INVENTION

To overcome the limitations in the prior art described above, and to overcome other limitations that will become apparent upon reading and understanding the present specification, the present invention provides a calibration apparatus for calibrating three-dimensional space for a machine vision system and a method for using the calibration apparatus for calibrating the machine vision system. The calibration apparatus comprises pairs of indicators mounted on a frame, such as pairs of lights, each pair of lights separated by a known horizontal distance. Each pair of lights is mounted at different heights, each height corresponding to a particular class of vehicles. The calibration apparatus may be mounted on the back of a vehicle that moves the apparatus through a roadway scene at a known speed. A machine vision system tracks the calibration apparatus, specifically the pairs of lights mounted on the frame, and maps the pixel space of the machine vision system to three-dimensional space.

The two-dimensional pixel space is mapped to three-dimensional space based on overlaid images of a pair of tracked indicators. Because the vehicle moves the calibration apparatus through the scene at a known speed, the real-world distance that the tracked indicators has moved between video frames may be determined. A ratio of the real-world horizontal distance between the tracked indicators and the pixel distance between the tracked indicators may be determined. Using the ratios coupled with the real-world distances traveled, a machine vision system can map the two-dimensional pixel space to three-dimensional space for all pixel coordinates in a roadway scene.

BRIEF DESCRIPTION OF THE DRAWINGS

The present invention will be more fully described with reference to the accompanying drawings wherein like reference numerals identify corresponding components, and.

DETAILED DESCRIPTION OF THE PREFERRED EMBODIMENT

In the following detailed description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
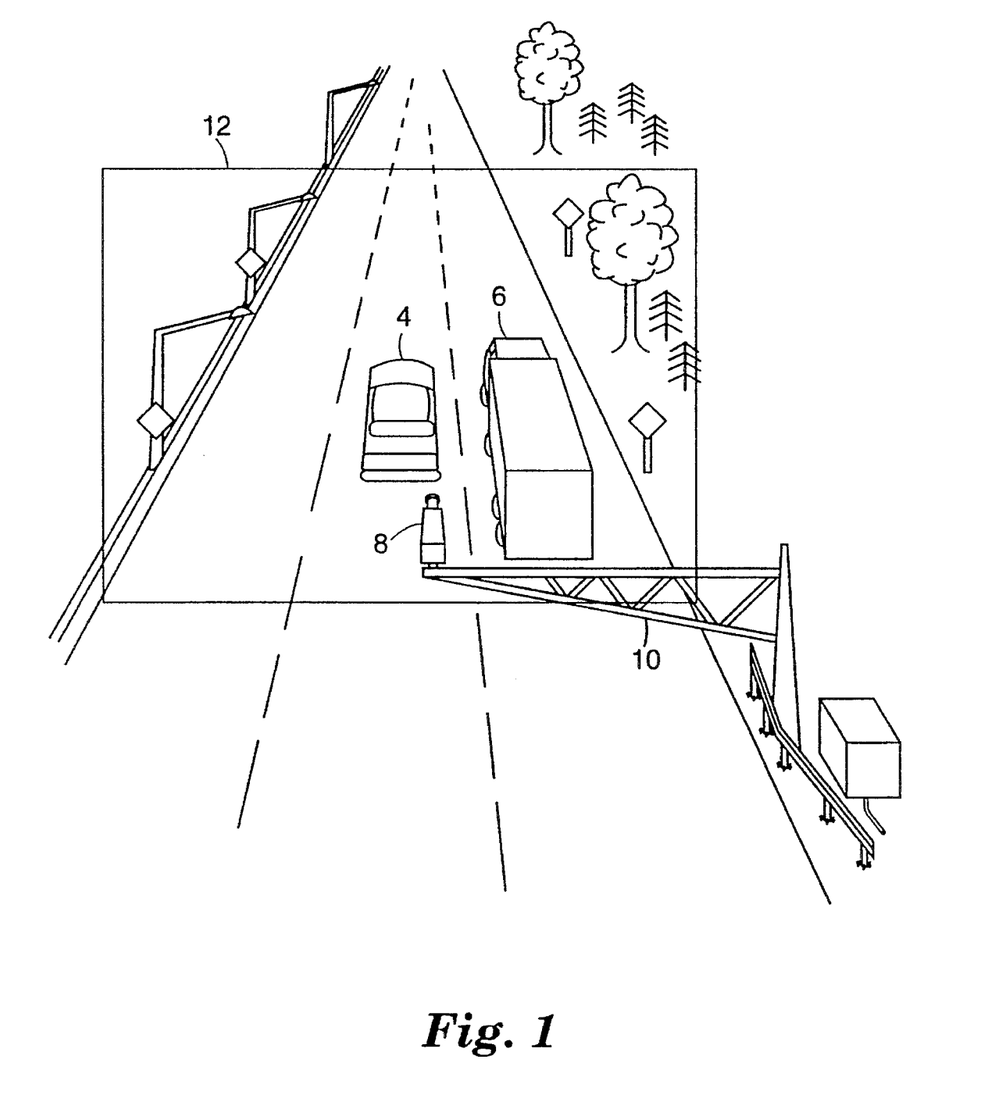
FIG. 1 is a perspective view of a typical roadway scene including a mounted video camera of the present invention.

Referring to FIG. 1, a typical roadway scene is shown. Different classes of vehicles, such as car 4 and semitrailer truck 6. Video camera 8 is positioned over the roadway by support 10 viewing scene 12. Machine vision systems evaluate roadway scenes such as scene 12, detecting and classifying vehicles, tracking vehicles and performing other traffic control and management duties. Machine vision systems evaluate roadway scenes by acquiring an image of the scene, using devices such as video camera 8. Video camera 8 can send video images to a processor adjacent to the camera or to a control center, where the video is analyzed. Video camera 8 can digitize the video image or the image can be digitized at a later time. A typical digitized video image will consist of a 512×512 pixel image.

Figure 2:
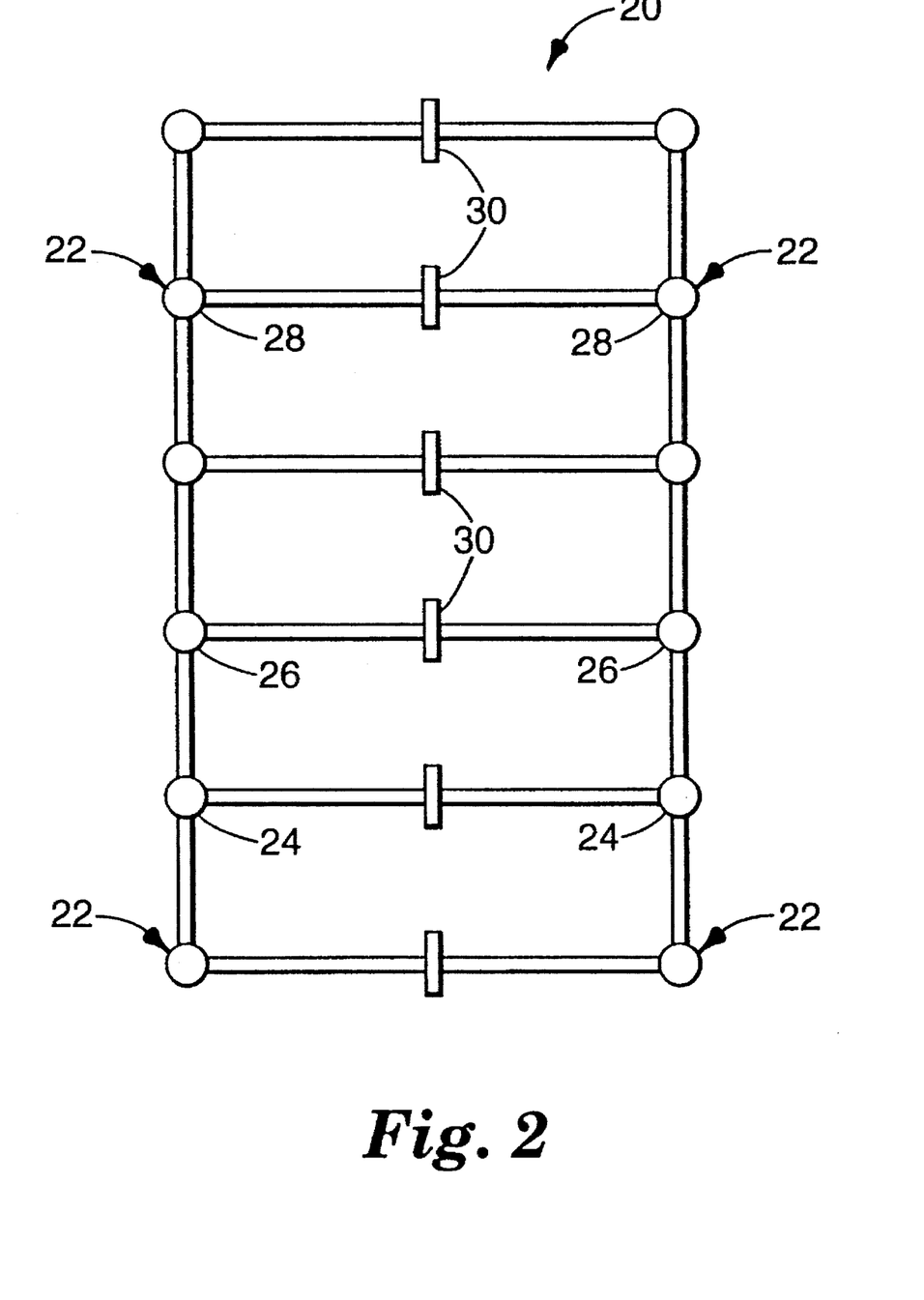
FIG. 2 is a perspective view of one embodiment of the calibration apparatus of the present invention.

Because the machine vision systems evaluate video images of roadway scenes in a pixel coordinate system, the machine vision systems must calibrate the roadway scenes to translate the information captured on video from a pixel coordinate system to a real-world system of measurements. Video images present a two dimensional view of the scene. Thus, as the distance from the video camera increases, the number of pixels that correspond to discrete real-world measurements decreases. Referring to FIG. 2, an apparatus used in the calibration process is shown. Markers 22 are mounted in pairs on frame 20 at a constant, known distance apart. In a preferred embodiment, markers 22 are placed 2.438 meters apart in a horizontal orientation. In one embodiment, a plurality of pairs of markers 22 are mounted on frame 20. Each pair of markers 22 are placed at different heights. Each of the different heights can correspond to a vehicle class. For example, motorcycle markers 24 are placed at a height, as measured from the ground after frame 20 is prepared for the calibration process, corresponding to an average height of a motorcycle. Automobile markers 26 are placed at a height corresponding to an average height of passenger automobiles. Bus markers 28 are placed at a height corresponding to an average height of buses. Similarly, markers may be placed at a height corresponding to any class or subclass of vehicles, such as vans, semitrailers, pickup trucks and sports utility vehicles.

Markers 22 can be any type of indicator that can be tracked by a machine vision system. In a preferred embodiment, markers 22 are lights. The lights can be any color, such as red or blue, and of any size that facilitates tracking. Lights are preferred for their ease of tracking. Vehicle path markers 30 are placed between the pairs of markers 22, preferably at their midpoint. Vehicle path markers 30 facilitate tracing of the center of the traffic lane for each class of vehicles.

Figure 3:
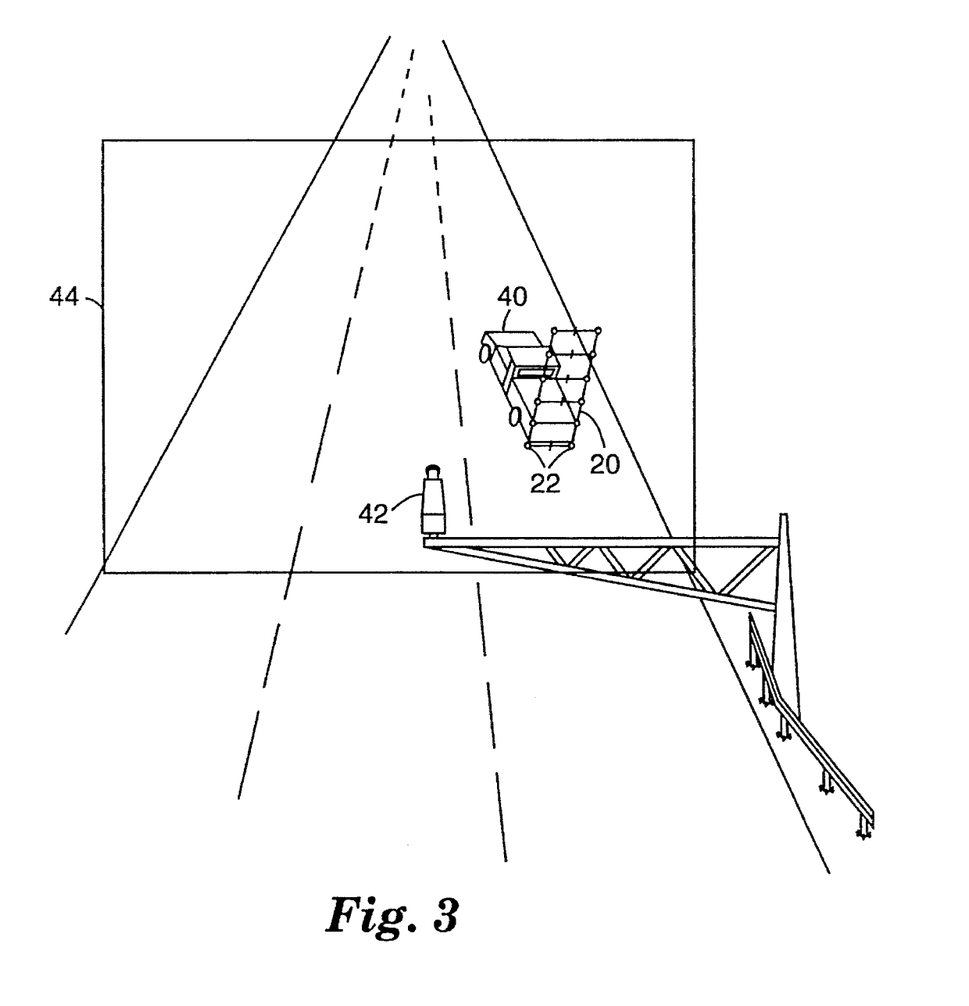
FIG. 3 shows a truck with the calibration apparatus mounted thereto driving through a roadway scene for calibrating the roadway.

Frame 20 must move through the scene to be calibrated at a known, constant speed. In a preferred embodiment, frame 20 is mounted on the back portion of a vehicle, such as a truck. In another embodiment, frame 20 is mounted on a trailer, that can be pulled by a vehicle. In FIG. 3, scene 44 must be calibrated. Frame 20 is mounted on the rear of a pickup truck 40, that drives through scene 44 at a constant, known speed. Video camera 42 of a machine vision system provides the video of pickup truck 40 driving through scene 44. The machine vision system then tracks markers 22 mounted on frame 20 through scene 44.

Figure 4:
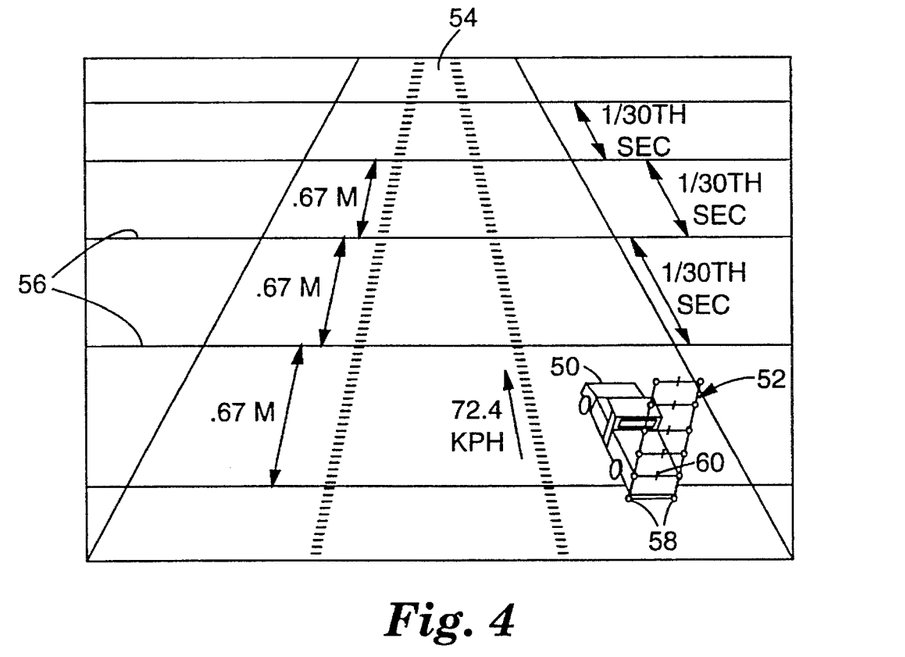
FIG. 4 illustrates consecutive overlaid video frames during the calibration process.

Calibration is performed by driving a vehicle equipped with the calibration apparatus down the roadway at a constant speed through the field of view of a video camera of a machine vision system. FIG. 4 shows a representation of a scene along with the progress of a vehicle within the scene as measured by the video camera. Vehicle 50, equipped with calibration apparatus 52, drives down roadway 54 at a constant, known speed. The video camera of the machine vision system captures video images of calibration apparatus 52 as vehicle 50 drives down roadway 54. The video image sequences are dynamically captured frame-by-frame, preferably in digitized form. In a preferred embodiment, vehicle 50 drives down roadway 54 at a speed of 72.4 kilometers per hour, and the video image sequences are captured at a rate of 30 images per second. Lines 56 drawn across the scene emphasize the fact that while real-world distances remain constant, the number of pixels corresponding to the constant real-world distances decreases as distance from the video camera increases. In the preferred embodiment, the vehicle travels approximately 0.67 meters per video frame. While the actual speed is not critical, it is necessary that the speed is known. Preferably the speed will also be constant.

As vehicle 50 drives down roadway 54, markers 58 are tracked for calibration purposes. Tracking can be performed manually, by a user, or automatically, by the machine vision system. A user can track markers 58 frame-by-frame, by recording the position of markers 58 within the video image. The user can accomplish this by moving a pointer onto the midpoint of each marker 58 and recording the pixels corresponding to markers 58, using a mouse. To avoid human error, a centroid finder may be programmed into the machine vision system to allow the user to give the approximate location of the midpoint of each marker and the system would identify the centroid of the tracked object. The user can further track the center of the traffic lane, if desired, by tracking vehicle path markers 60. Vehicle path markers 60 may be manually tracked in a manner similar to markers 58, by placing a mouse pointer on the appropriate pixels and clicking on them using a mouse. Alternatively, markers 58 may be tracked by the machine vision system. If markers 58 comprise lights, the machine vision system can be programmed to track lights, or if calibrated when other lights are present, to track lights of a particular color. Vehicle path markers 60 may also be tracked or, in an alternative embodiment without vehicle path markers 60, the midpoint of each pair of markers 58 may be determined in each video frame when each pair of markers 58 is tracked to determine the center of the traffic lane for a particular class of vehicles.

Figure 5:
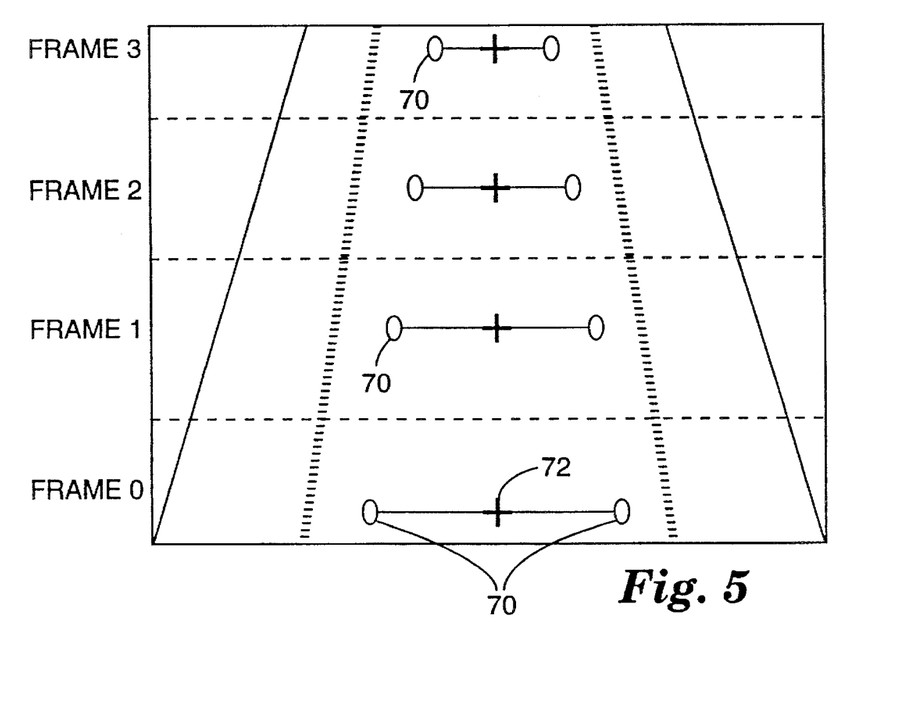
FIG. 5 illustrates consecutive overlaid frames of a pair of tracked markers and tracked video path markers.

After vehicle 50 has been tracked through the scene, the tracking data from the images of the video frames may be recorded sequentially and overlaid in a single image. In a typical video camera view, the video camera will acquire 250–300 video frames when tracking a vehicle driving at 72.4 kilometers per hour through a scene. FIG. 5 shows a single pair of markers 70 being tracked through four frames and the tracking data sequentially overlaid in a single image. The horizontal and vertical components of the position of the midpoint of vehicle path marker 72, the real-word distance the pair of markers have moved, and the ratio of real-world distance between the pair of markers to the pixel distance between the pair of markers must be determined for each pair of markers 70 as the pair moves through the traffic scene, as shown in Table 1.

TABLE 1

| frame | y | x | $D = \text{frame} \cdot d_r$ | $R_x = \frac{W_r}{W_p}$ |
|---|---|---|---|---|
| 0 | | | | |
| 1 | | | | |
| ... | | | | |
| n | | | | |

In Table 1, the horizontal and vertical components of the position of the vehicle path in a particular video frame, x and y respectively, may be determined by the position of the pixel which the user selects as the midpoint of the vehicle path marker 72 when manually tracking the calibration apparatus in the video image. D represents the total real-word distance the calibration apparatus has traveled from its first entrance into the traffic scene. In a preferred embodiment, D represents the total distance traveled along the vehicle's path in real space. Because the calibration apparatus is moving through the traffic scene at a known constant speed and because the rate of the image acquisition by the video camera is at a constant, the total distance traveled in the y-coordinate is a constant real-world distance in each video frame. For example, if the calibration apparatus moves through the traffic scene at a speed of 72.4 kilometers per hour and the image acquisition occurs at a rate of 30 frames per second, the calibration apparatus travels approximately 0.67 meters per frame. Therefore, D can be determined by multiplying $d_r$, the constant real-world distance traveled per frame, and in the preferred embodiment 0.67 meters per frame, with the number of frames needed since the initiation of tracking. For example, in the preferred embodiment, in the third frame the calibration apparatus has moved approximates 2.0 meters since the initiation of tracking. The value for $w_p$, the pixel distance between the pair of markers 70, a horizontal width in a preferred embodiment, may be obtained by taking the absolute value of the difference of the x-coordinates of the positions of each marker of the pair of markers 70. The value for $w_r$, the real-world distance between the markers 70, and a horizontal width in a preferred embodiment, is a constant value. $R_x$ represents the ratio of real-world measurements to pixel measurements in the x-coordinate.

After values of x, D, and $R_x$ are determined for the y values associated with the tracked pair of markers, the values of x, D, and $R_x$ are determined for all discrete y values lying between consecutive video frames. In the preferred embodiment, when the calibration apparatus moves through the scene at the moderate speed of 72.4 kilometers per hour and moves the relatively small real-world distance of 0.67 meters per video frame, linear interpolation may be used to compute the values of x, D, and $R_x$ for each discrete y value. Equations 1 and 2 may be used to determine the slope, m, and the y-intercept, b, values for a line connecting pixel coordinates in consecutive video frames, namely, (x[frame], y[frame]) and (x[frame+1], y[frame+1]), where frame=0 to n−1, and n+1 is the number of frames ranging from 0 to n.

$$m = \frac{y[\text{frame}+1] - y[\text{frame}]}{x[\text{frame}+1] - x[\text{frame}]} \qquad \text{(Equation 1)}$$

$$b = y[\text{frame}] = m \cdot x[\text{frame}] \qquad \text{(Equation 2)}$$

After m and b have been determined, values for x, D and $R_x$ may be determined for all discrete y values lying between consecutive frames, namely, for y=y[frame] to y[frame+1], using Equations 3, 4, and 5.

$$x = \frac{y - b}{m} \qquad \text{(Equation 3)}$$

$$D = \left( \frac{y - y[\text{frame}]}{y[\text{frame}+1] = y[\text{frame}]} \right) \cdot d_r + D[\text{frame}] \qquad \text{(Equation 4)}$$

$$R_x = \left( \frac{y - y[\text{frame}]}{y[\text{frame}+1] = y[\text{frame}]} \right). \qquad \text{(Equation 5)}$$

$$(R_x[\text{frame}+1] - R_x[\text{frame}]) + R_x[\text{frame}]$$

The process may be completed for each lane in the roadway as well as areas between the lanes, depending on the width of the calibration apparatus. After values for x, D, and $R_x$ have been calculated for all values of y in the scene, they may be placed in a table as shown in Table 2.

| y | x | D | $R_x$ |
|---|---|---|---|
| $y_{min}$ | | | |
| ••• | | | |
| ••• | | | |
| $y_{max}$ | | | |

This table defines the calibration from a pixel coordinate system to a real-world coordinate system for any point along the road surface. This table may be placed in memory of the machine vision system and used as a lookup table to translate pixel measurements to real-world measurements. A table similar to Table 2 may be generated for all pairs of markers on the calibration apparatus. The result of calibration is a plurality of parallel piecewise linear surfaces generated in space, the number of parallel surfaces depending on the number of pairs of markers. Thus, for more classes of vehicles, as determined by height of vehicles within the class, more pairs of markers are used.

In order to utilize the calibration information contained in Table 2, it is recognized that the size of the vehicle tracked must be considered in conjunction with the calibration information. For example, when a truck first enters a roadway scene, it will occupy many more pixels than a motorcycle that first enters the same roadway scene. Therefore, a machine vision system must be able to consider the classification of the vehicle as determined by its size when utilizing the calibration information produced from the present invention.

Once the machine vision system can translate pixel measurements to real-world measurements, the system can determine many traffic parameters, for example, displacement, acceleration, velocity, highway occupancy and headway. To determine the average velocity of a vehicle, a first position of the vehicle $y_{v_o}$ at time $t_{v_o}$ is recorded. The first position is preferably the first position that the machine vision system tracks the vehicle. Thereafter, for any time t, where t is the time when the vehicle is at position (x,y), the average velocity for the vehicle being tracked is given by Equation 6, where y is used as the index into a lookup table like Table 2.

$$\text{velocity} = \frac{D[y] - D[y_{v0}]}{t - t_{v0}} \text{ meters/second} \quad \text{(Equation 6)}$$

The approximate instantaneous velocity may also be calculated for any vehicle being tracked, by taking the distance traveled between any two consecutive positions of the vehicle and dividing by the time required to travel that distance. Since vehicle positions are acquired for each video frame, the elapsed time between vehicle positions is 1/30th of a second. Distances traveled are obtained by two table lookups to Table 2 and determining the difference between the two positions. Thus, if y and $y_i$ are two consecutive y positions of the vehicle being tracked, then the approximate instantaneous velocity is given by Equation 7.

$$\text{velocity} = \frac{D[y_i] - D[y_{i-1}]}{1/30} \text{ meters/second} \quad \text{(Equation 7)}$$

Similar calculations may be performed for acceleration. All calculations are performed by acquiring positional values from the lookup table in memory and a few arithmetic operations. This embodiment allows fast computation of traffic parameters with little use of computation power.

Lateral displacement may also be computed by looking at the position of a tracked vehicle. To determine the lateral displacement of the tracked vehicle from the center of a lane, the x-coordinate of the midpoint of the vehicle path marker, as determined from the calibration process, that corresponds to the y-coordinate of the tracked vehicle is acquired from Table 2. The x-coordinate of the midpoint of the vehicle path marker defines the center of the lane for that particular y-coordinate in pixel space. To determine the pixel distance that the tracked vehicle is from the center of the lane, the difference of the x-coordinates of the tracked vehicle and the vehicle path marker is obtained. To determine the real-world distance that the tracked vehicle is from the center of the lane, the difference value in pixel space is multiplied by the $R_x$ ratio for the y-coordinate. Total lateral displacement may also be determined from two consecutive positions of the tracked vehicle, namely $(x_i, Y_i)$ and $(x_{i+1}, y_{i+1})$. If $y_i$ and $y_{i+1}$ are used as indices to Table 2, then the total lateral displacement may be determined from Equation 8.

lateral displacement=$(x_{i+1}-x[y_{i+1}]) \cdot R_x[y_{i+1}]+$
$(x[Y_1]-x_i) \cdot R_x[y_1]$meters  (Equation 8)

Lateral velocity is obtained by dividing the lateral displacement as determined in Equation 8 by the time between measurements, in a preferred embodiment 1/30th of a second. Lateral acceleration is obtained by taking the difference between two successive lateral velocities and dividing by the rate of image acquisition, in a preferred embodiment, 1/30th of a second.

Figure 6:
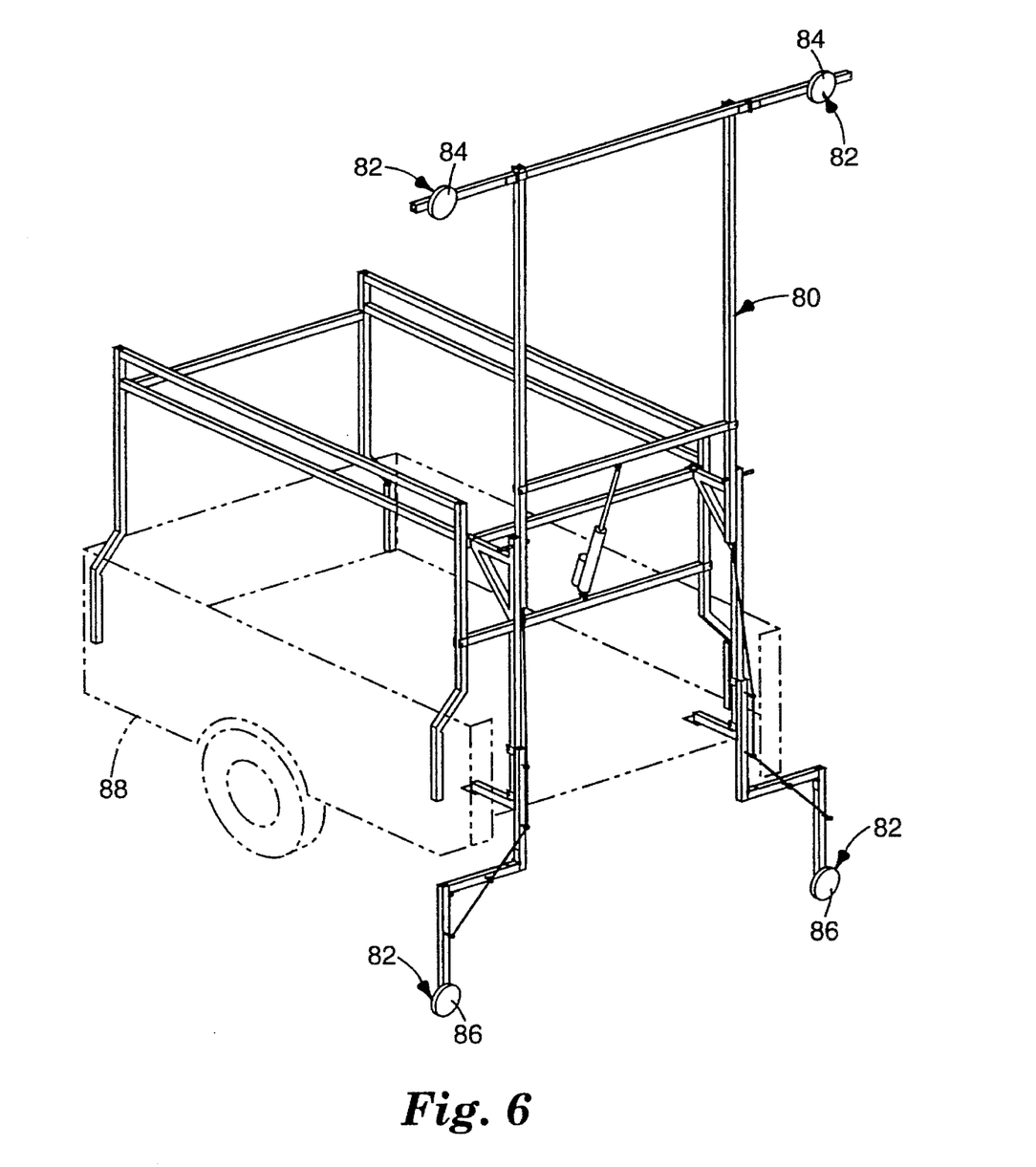
FIG. 6 is a perspective view of a second embodiment of the calibration apparatus of the present invention.
Figure 7:
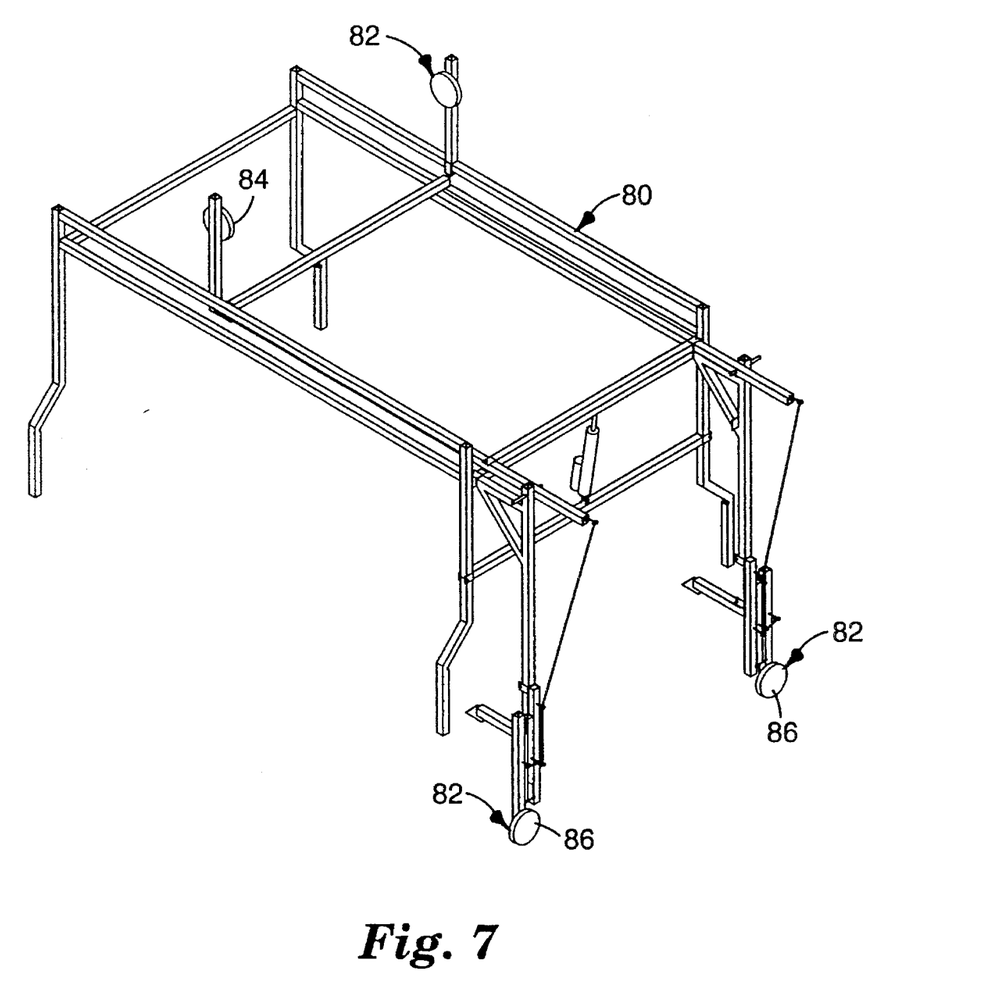
FIG. 7 is a perspective view of the second embodiment of the calibration apparatus of the present invention in a collapsed configuration.

Another preferred embodiment of the calibration apparatus is shown in FIG. 6. Frame 80 is an adjustable frame with markers 82 mounted on the frame. Frame 80 may be adjusted wherein pairs of markers 82 may be moved to different heights. Further, frame 80 may be collapsible, whereby the frame, mounted on a vehicle such as a the bed 88 of a pickup truck, may fold into a compact configuration as shown in FIG. 7. Allowing frame 80 to collapse protects the calibration apparatus from damage when the vehicle on which the apparatus is mounted is not being driven through a scene to be calibrated. Lights 86 fold up, away from the roadway while lights 84 fold down, securing them in the bed of the pickup truck. In a preferred embodiment, the width between each pair of markers 82 is 2.438 meters, the height of top pair of markers 84 is 3.962 meters and the height of bottom pair of markers 86 is approximately 0.076 meters from the ground.

Figure 8:
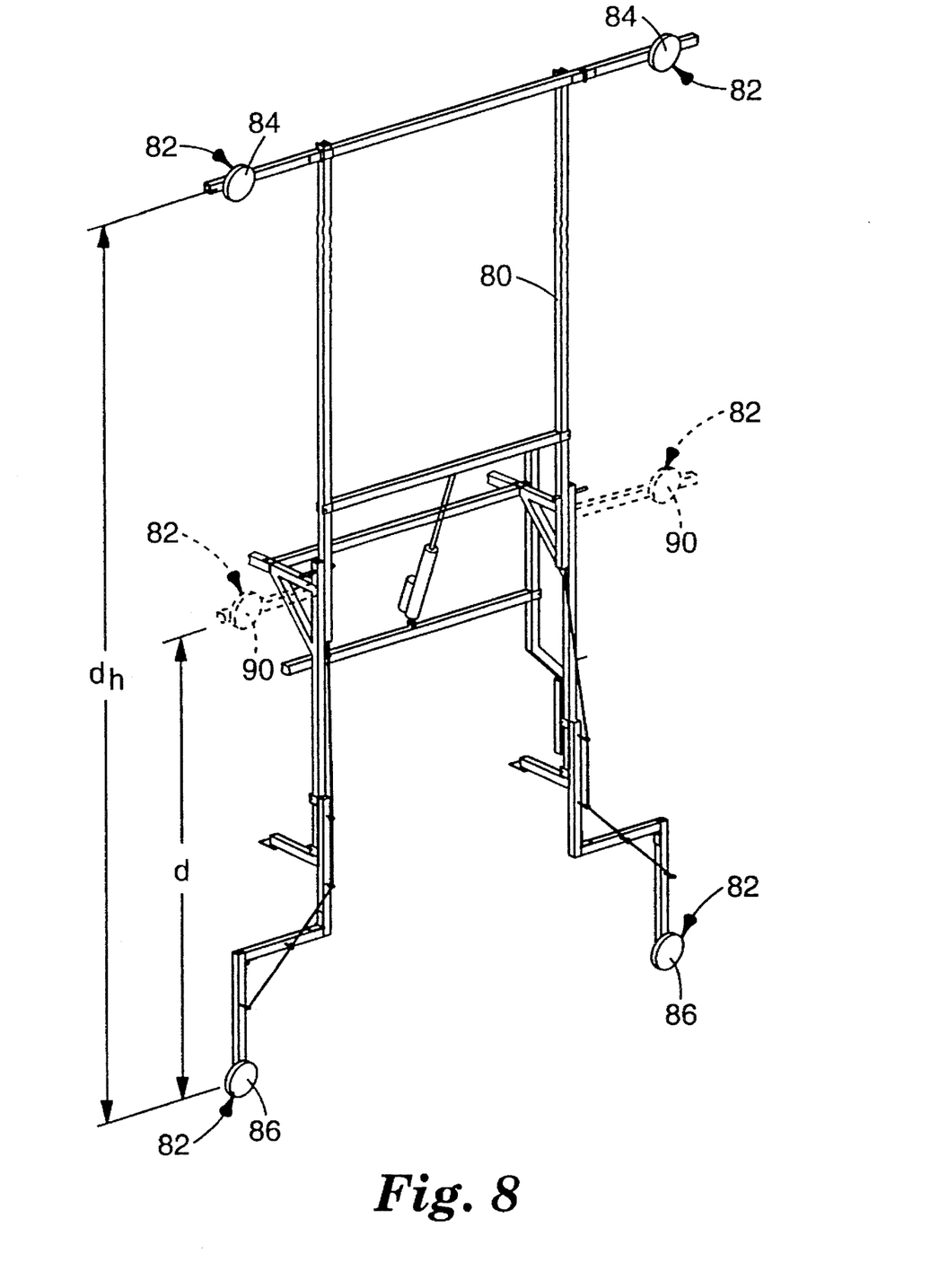
FIG. 8 illustrates the placement of virtual markers and their relationship to the markers in the second embodiment of the calibration apparatus.

In the embodiment of FIG. 6, only two pairs of markers are tracked. Because of the need to calibrate pixel space for different classes of vehicles, as determined by height, heights between the top pair of markers 84 and the bottom pair of markers 86 must also be calibrated. For any height, the y, x, D, and $R_x$ values may be determined by interpolation, such as by using aforementioned Equations 1–5. In FIG. 8, virtual pair of markers 90 are a distance d above bottom pair of markers 86. Top pair of markers 84 are a distance dh above bottom pair of markers 86. The pixel coordinates $(x_d, y_d)$ of each marker of virtual marker pair 90 can be determined from Equation 9, where $(x_t, y_t)$ are the pixel coordinates of the top pair of markers 84 and $(x_b, y_b)$ are the pixel coordinates of the bottom pair of markers 86.

$$(x_d, y_d) = \left(1 - \frac{d}{d_h}\right)(x_b, y_b) + \left(\frac{d}{d_h}\right)(x_t, y_t) \quad \text{(Equation 9)}$$

Once the pixel coordinates are determined for virtual pair of markers 90, those coordinates can be used in the interpolation equations. The midpoint of virtual pair of markers 90 may also be determined to define the center of the lane. Since any distance d can be chosen that allows virtual pair of marker 90 to fall between top pair of markers 84 and bottom pair of markers 86, this embodiment allows a user great flexibility in choosing height parameters for vehicle classes.

In the embodiments of FIG. 2 or FIG. 6, the values of y, x, D, and $R_x$ may be placed in a lookup table, such as Table 2, placed in memory for all calibrated pixel coordinates within a video scene. Alternatively, a lookup table may be placed in memory that only contains the values associated with the actual marker locations, and for all discrete values of y that are not located within the lookup table may be calculated as necessary, using equations similar to Equations 1–5. This embodiment requires a smaller amount of data to be stored at memory locations but may require more computations.

Although a preferred embodiment has been illustrated and described for the present invention, it will be appreciated by those of ordinary skill in the art that any method or apparatus which is calculated to achieve this same purpose may be substituted for the specific configurations and steps shown. This application is intended to cover any adaptations or variations of the present invention. Therefore, it is manifestly intended that this invention be limited only by the appended claims and the equivalents thereof.

What is claimed is:

1. A system for calibrating a three-dimensional space, said system for use with a machine vision system, said system comprising:

a) a frame;

b) at least one pair of indicators mounted on said frame;

c) movement means for moving said frame through said three-dimensional space at a known constant speed;

d) means for tracking said at least one pair of indicators through said three-dimensional space; and e) means for mapping pixel space to said three-dimensional space based on the location of said at least one pair of indicators within said pixel space and said known, constant speed of said at least one pair of indicators, thereby calibrating said three-dimensional space.

2. The apparatus for calibrating a three-dimensional space according to claim 1, wherein said at least one pair of indicators comprises at least one pair of lights.

3. The apparatus for calibrating a three-dimensional space according to claim 1, wherein said at least one pair of indicators comprises a plurality of pairs indicators, said pairs of indicators horizontally spaced apart at a constant width, each pair of indicators located on different vertical planes.

4. The apparatus for calibrating a three-dimensional space according to claim 3, wherein said indicators are located on different vertical planes based on different vehicle classes.

5. The apparatus for calibrating a three-dimensional space according to claim 1, wherein said movement means comprises a vehicle.

6. The apparatus for calibrating a three-dimensional space according to claim 1, wherein said frame is a collapsible frame.

7. The apparatus for calibrating a three-dimensional space according to claim 1, wherein said at least one pair of indicators are adjustably mounted onto said frame.

8. The system for calibrating a three-dimensional space according to claim 1, wherein said means for tracking includes means for acquiring video images, said video images comprising a plurality of video frames with images of said at least one pair of indicators taken at constant intervals.

9. The system for calibrating a three-dimensional space according to claim 8, further comprising a memory having memory locations, wherein said at least one pair of indicators are spaced apart by a known real-world horizontal distance and wherein said means for mapping comprises:

a) means for determining a first pair of pixel coordinates and a second pair of pixel coordinates for each pair of indicators within said acquired video images, said first and second pair of pixel coordinates having a horizontal coordinate and a vertical coordinate;

b) means for determining a total real-world distance said at least one pair of indicators has moved in the vertical pixel direction; and c) means for determining a ratio of said known real-world horizontal distance between said pair of indicators to the difference of said first and second horizontal pixel coordinates, said ratio determined for each said pair of indicators in each said video frame;

d) means for storing said ratios, said total real-world distances said at least one pair of indicators has moved, and said horizontal coordinates for each said vertical coordinate in said memory locations.

10. The system for calibrating a three-dimensional space according to claim 9, wherein said at least one pair of indicators comprises a plurality of pairs of indicators and wherein said means for mapping further comprises:

a) means for interpolating between said ratios and said total real-world distances moved associated with said vertical coordinates lying in said video frames to determine ratios and distances for all vertical coordinates lying between said vertical coordinates of said indicators in said frames; and b) means for placing said interpolated ratios, said total real-world distance moved, and said horizontal coordinates for each said vertical coordinate in said memory locations.

* * * * *